(12) United States Patent
Hanrahan

(10) Patent No.: US 12,385,435 B1
(45) Date of Patent: Aug. 12, 2025

(54) BEARING SCAVENGE PUMP INCORPORATED INTO TURBINE DISK COVER PLATE

(71) Applicant: Raytheon Technologies Corporation, Farmington, CT (US)

(72) Inventor: Paul R. Hanrahan, Sedona, AZ (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/133,685

(22) Filed: Apr. 12, 2023

(51) Int. Cl.
| | |
|---|---|
| *F02C 7/06* | (2006.01) |
| *F02C 7/18* | (2006.01) |
| *F01D 5/08* | (2006.01) |
| *F01D 25/12* | (2006.01) |
| *F01D 25/18* | (2006.01) |
| *F02C 7/16* | (2006.01) |

(52) U.S. Cl.
CPC .................. *F02C 7/06* (2013.01); *F02C 7/18* (2013.01); *F01D 5/081* (2013.01); *F01D 5/087* (2013.01); *F01D 25/12* (2013.01); *F01D 25/125* (2013.01); *F01D 25/18* (2013.01); *F02C 7/16* (2013.01); *F02C 7/185* (2013.01); *F05D 2210/13* (2013.01); *F05D 2260/20* (2013.01); *F05D 2260/205* (2013.01); *F05D 2260/232* (2013.01); *F05D 2260/98* (2013.01)

(58) Field of Classification Search
CPC ............. F01D 5/081–087; F01D 25/12; F01D 25/125; F01D 25/18; F02C 7/16; F02C 7/18; F02C 7/185; F02C 7/06; F05D 2260/20; F05D 2260/205; F05D 2260/232; F05D 2260/98; F05D 2210/13
See application file for complete search history.

(56) References Cited

U.S. PATENT DOCUMENTS

| | | | | |
|---|---|---|---|---|
| 3,814,539 | A * | 6/1974 | Klompas | F01D 5/3015 416/193 A |
| 4,478,551 | A * | 10/1984 | Honeycutt, Jr. | F01D 25/162 415/142 |
| 5,018,943 | A * | 5/1991 | Corsmeier | F16F 15/32 416/220 R |
| 5,450,719 | A * | 9/1995 | Marsh | F01D 25/16 60/39.83 |
| 5,984,636 | A * | 11/1999 | Fahndrich | F01D 5/3015 415/178 |
| 7,458,766 | B2 * | 12/2008 | Dailey | F01D 5/082 415/115 |
| 8,708,652 | B2 | 4/2014 | Caprario et al. | |
| 8,973,371 | B2 | 3/2015 | King et al. | |
| 10,072,585 | B2 * | 9/2018 | Mosley | F02C 7/18 |
| 11,181,007 | B1 * | 11/2021 | Ress, Jr. | F01D 25/125 |

(Continued)

*Primary Examiner* — David E Sosnowski
*Assistant Examiner* — Art Golik
(74) *Attorney, Agent, or Firm* — Bachman & LaPointe, P.C.

(57) ABSTRACT

A bearing scavenge pump incorporated into a disk cover plate including a rotor disk having a rear surface and an axis; the disk cover plate attached to the rotor disk, the disk cover plate including fins extending into a gap formed between a rear surface of the rotor disk and the disk cover plate, the disk cover plate including anti-vortex features located axially distal from the fins relative to the axis; an inverted bearing located in a bearing compartment proximate the disk cover plate and disk; and a liquid fuel lubricant contacting the inverted bearing.

13 Claims, 3 Drawing Sheets

(56) References Cited

U.S. PATENT DOCUMENTS

| | | | | |
|---|---|---|---|---|
| 2008/0075590 A1* | 3/2008 | Moniz | ................ | F02C 7/36 |
| | | | | 415/229 |
| 2009/0004012 A1* | 1/2009 | Caprario | ............ | F01D 5/3015 |
| | | | | 416/193 A |
| 2011/0123325 A1* | 5/2011 | Morris | ................ | F01D 5/082 |
| | | | | 415/208.1 |
| 2013/0115081 A1* | 5/2013 | Wu | ................ | F01D 5/3007 |
| | | | | 416/97 R |
| 2018/0119574 A1* | 5/2018 | Ertas | ................ | F02C 7/06 |

\* cited by examiner

BEARING SCAVENGE PUMP INCORPORATED INTO TURBINE DISK COVER PLATE

BACKGROUND

The present disclosure is directed to expendable gas turbine engines with improved air-cooled fuel lubricated bearings.

Attritable or expendable propulsion systems have a short lifespan relative to typical flight applications. The attritable engine is utilized for a limited lifespan and disposed. The attritable gas turbine engine may not even be operated through a full operational cycle. The attritable gas turbine engine may only perform start-up, and operational load before being decommissioned.

Since the operational modes of the attritable gas turbine engine may be significantly less than the conventional gas turbine engine, the attritable engine does not need to meet the same durability or safety requirements as the conventional gas turbine engine. Conventional gas turbine engine designs deployed for attritable engines can be more costly and more complex than needed.

What is needed is a less complex and less costly turbine engine design for the attritable engine.

SUMMARY

In accordance with the present disclosure, there is provided a bearing scavenge pump incorporated into a disk cover plate comprising a rotor disk having a rear surface and an axis; a cover plate attached to the rotor disk, the cover plate including anti-vortex features extending into a gap formed between a rear surface of the rotor disk and the cover plate; an inverted bearing located in a bearing compartment proximate the cover plate and disk; and a liquid lubricant contacting the inverted bearing.

A further embodiment of any of the foregoing embodiments may additionally and/or alternatively include the cover plate includes fins located at least one of on a lower portion of the cover plate, inside a chamber formed between the rotor disk and cover plate upstream of the lower portion, or both.

A further embodiment of any of the foregoing embodiments may additionally and/or alternatively include the fins are configured to pump air radially outwardly relative to the axis toward an exhaust nozzle section.

A further embodiment of any of the foregoing embodiments may additionally and/or alternatively include the anti-vortex features include radial holes and/or vanes within the coverplate oriented radially distal from the fins relative to the axis.

A further embodiment of any of the foregoing embodiments may additionally and/or alternatively include the anti-vortex features are configured as tubing/passages that are configured to prevent swirling by cooling air.

A further embodiment of any of the foregoing embodiments may additionally and/or alternatively include the inverted bearing includes a static inner race and dynamic outer race and sump configured to spin.

A further embodiment of any of the foregoing embodiments may additionally and/or alternatively include the liquid lubricant is introduced into a cooling air, entrained in the cooling air and provided to lubricate the inverted bearing and where at least a portion of the cooling air is scavenged with the liquid lubricant.

In accordance with the present disclosure, there is provided an attritable gas turbine engine turbine section with bearing scavenge pump incorporated into a disk cover plate comprising turbine rotors including a rotor disk, and a plurality of circumferentially spaced turbine blades, the rotor disk having a rear surface and an axis; a cover plate attached to the rotor disk, the cover plate including anti-vortex features extending into a gap formed between a rear surface of the rotor disk and the cover plate; an inverted bearing is located in a bearing compartment proximate the cover plate and disk; and a fuel tank providing a liquid fuel lubricant contacting the inverted bearing.

A further embodiment of any of the foregoing embodiments may additionally and/or alternatively include the cover plate includes fins located at least one of on a lower portion of the cover plate, inside a chamber formed between the rotor disk and cover plate upstream of the lower portion, or both.

A further embodiment of any of the foregoing embodiments may additionally and/or alternatively include the fins are configured to pump air radially outwardly relative to the axis toward an exhaust nozzle section.

A further embodiment of any of the foregoing embodiments may additionally and/or alternatively include the anti-vortex features include holes and/or vanes oriented radially distal from the fins relative to the axis.

A further embodiment of any of the foregoing embodiments may additionally and/or alternatively include the anti-vortex features are configured as tubing/passages that are configured to prevent swirling by cooling air.

A further embodiment of any of the foregoing embodiments may additionally and/or alternatively include the inverted bearing includes a static inner race and dynamic outer race and sump configured to spin.

In accordance with the present disclosure, there is provided a process for lubricating an attritable gas turbine engine turbine section with bearing scavenge pump incorporated into a disk cover plate comprising providing turbine rotors including a rotor disk, and a plurality of circumferentially spaced turbine blades, the rotor disk having a rear surface and an axis; attaching a cover plate to the rotor disk, the cover plate including anti-vortex features extending into a gap formed between a rear surface of the rotor disk and the cover plate; locating an inverted bearing in a bearing compartment proximate the cover plate and disk; and contacting the inverted bearing with a liquid lubricant.

A further embodiment of any of the foregoing embodiments may additionally and/or alternatively include the process further comprising supplying a cooling air to a rear surface of the rotor disk between an axially downstream side of the cover plate and an axially upstream face of the rotor disk.

A further embodiment of any of the foregoing embodiments may additionally and/or alternatively include the process further comprising carrying the liquid fuel lubricant with the cooling air to the inverted bearing impelled by a pumping action induced by rotation of the rotor disk and cover plate.

A further embodiment of any of the foregoing embodiments may additionally and/or alternatively include the process further comprising forming the gap between the cover plate and a contour of the rotor disk; and creating a boundary layer effect that pumps a cooling air from a central location to a radially outward location near an exhaust nozzle section responsive to rotation of the cover plate and the rotor disk.

A further embodiment of any of the foregoing embodiments may additionally and/or alternatively include the process further comprising configuring the anti-vortex features as tubing/passages; and preventing swirling by cooling air.

A further embodiment of any of the foregoing embodiments may additionally and/or alternatively include the inverted bearing includes a static inner race and dynamic outer race sump configured to spin.

A further embodiment of any of the foregoing embodiments may additionally and/or alternatively include the cover plate includes fins located at least one of on a lower portion of the cover plate, inside a chamber formed between the rotor disk and cover plate upstream of the lower portion, or both; wherein the anti-vortex features include holes and/or vanes oriented radially distal from fins relative to the axis.

Other details of the bearing scavenge pump incorporated into high pressure turbine disk coverplate are set forth in the following detailed description and the accompanying drawings wherein like reference numerals depict like elements.

DETAILED DESCRIPTION

Figure 1:
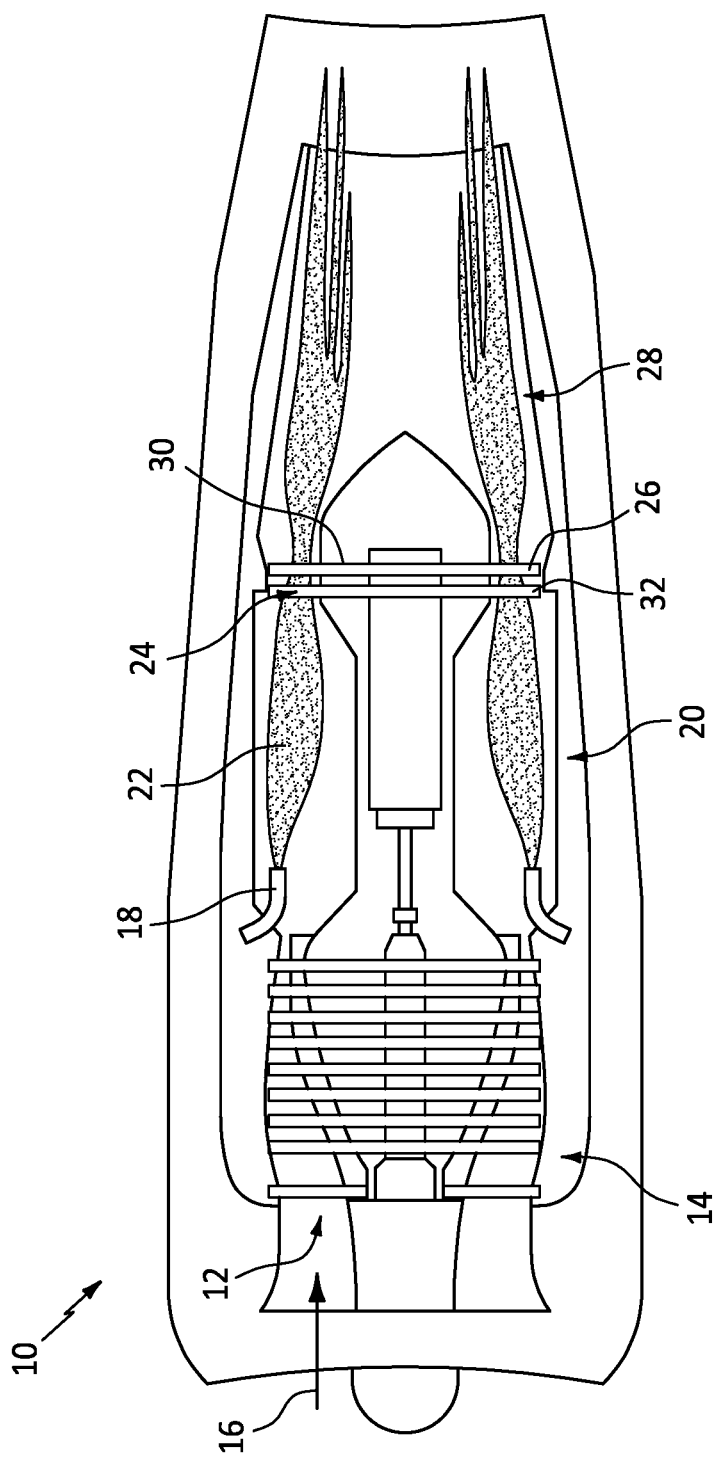
FIG. 1 is a cross sectional view schematic representation of an exemplary attritable gas turbine engine.

Referring now to FIG. 1, there is illustrated an exemplary attritable gas turbine engine, specifically a turbojet engine 10. The gas turbine engine 10 includes an inlet section 12 upstream of a compressor section 14 where air 16 is drawn in and compressed. Fuel 18 is injected into a combustion section 20 downstream of the compressor section 14. The air 16 is mixed with fuel 18 and burned in the combustion section 20. The combusted fuel 18 and air 16 are combined into a highly energized combustion product 22 that expands through a turbine section 24 (HPT). The products of combustion move downstream over turbine rotors 26, driving the turbine rotors 26 to rotate creating rotary power. The products of combustion 22 move downstream, exit the turbine section 24 and flow into the exhaust nozzle section 28 where engine thrust is developed for propulsion.

Figure 2:
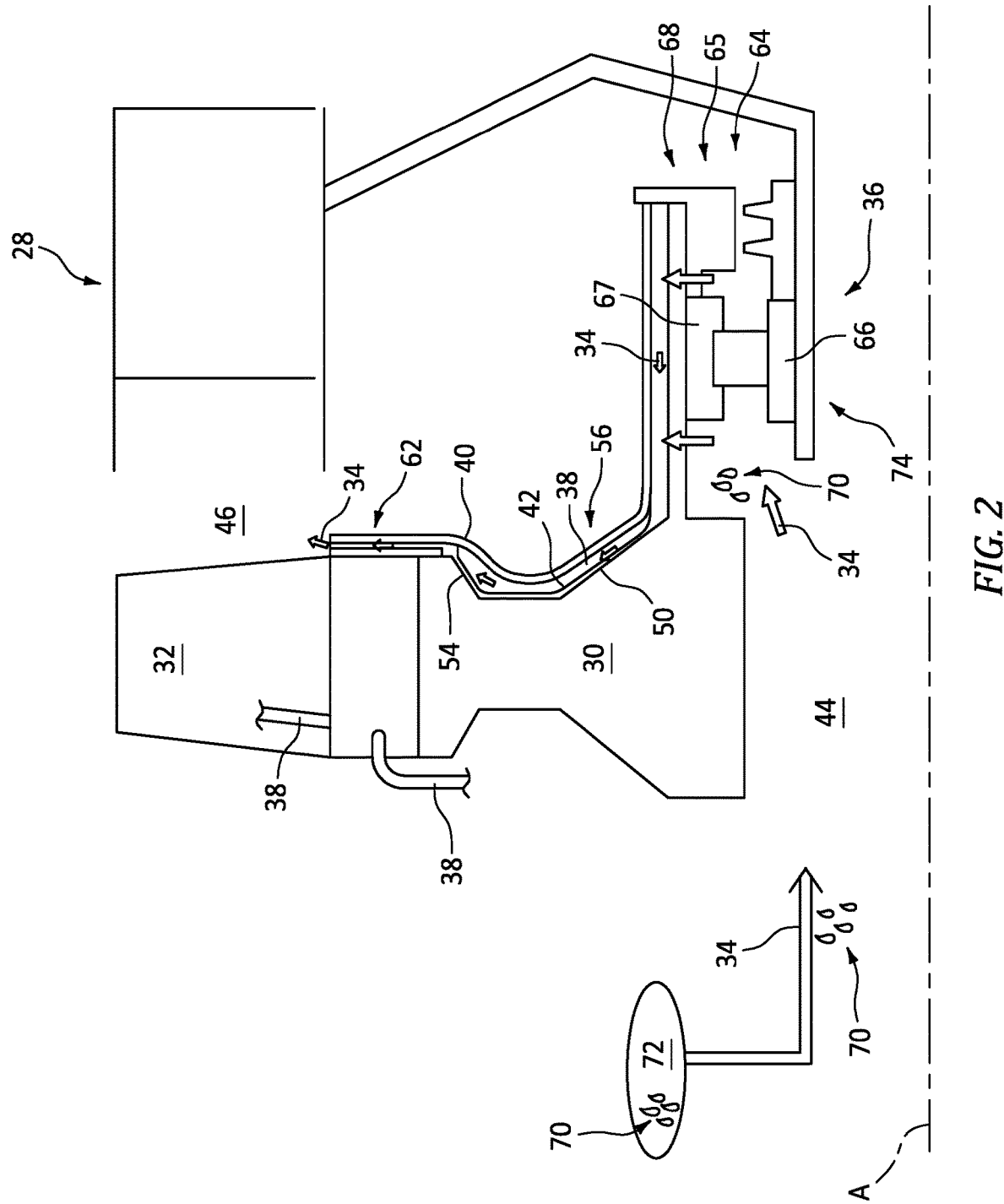
FIG. 2 is a cross sectional view schematic representation of an exemplary scavenge pump in a disk coverplate.
Figure 3:
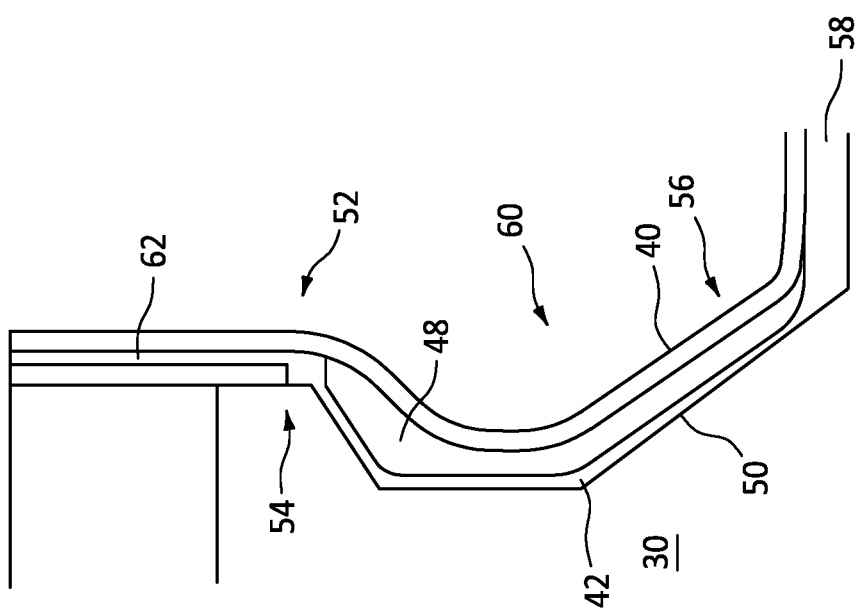
FIG. 3 is a schematic representation of details of an exemplary scavenge pump in a disk coverplate.

Referring also to FIG. 2 and FIG. 3, the turbine rotors 26 can include a rotor disk 30, and a plurality of circumferentially spaced removable turbine blades 32. Since the rotor disk 30 and turbine blades 32 are subject to extreme temperatures, cooling air 34 is typically delivered to bearings 36 and the rotor disk 30 and blade 32 for cooling through various cooling passages 38. The rotor disk 30 rotates about an axis A.

To seal the cooling passages 38, a cover plate 40 can be attached to the rotor disk 30. The cover plate 40 can form a gap 42 by following the contour of the rotor disk 30 to create a boundary layer effect that pumps cooling air 34 from a central location 44 to a radially outward location 46 near the exhaust nozzle section 28 when the cover plate 40 and rotor disk 30 rotate. The cover plate 40 can be formed with one or more internal fins 48, each of which increases the pumping effectiveness.

The cooling air 34 can be supplied to a rear surface 50 between an axially downstream side 52 of the cover plate 40 and an axially upstream face 54 of the rotor disk 30. In order to improve air pumping effectiveness, the fin(s) 48 can be incorporated into the cover plate 40. The fin(s) 48 can be located on the lower portion 56 of the cover plate 40 or inside a chamber 58 formed between the rotor disk 30 and cover plate 40 upstream of the lower portion 56 or both. Fin(s) 48 can extend along the entirety of the lower portion 56 and/or the chamber 58. The fin(s) 48 can extend the length of the cooling passage from the lower portion 56 to a mid portion 60. In exemplary embodiments, the fin(s) 48 need not extend along the entirety of these portions or be continuous. The fin geometry shown in FIG. 2 and FIG. 3 is only one potential non-limiting embodiment.

As the rotor disk 30 and cover plate 40 are driven to rotate by the products of combustion 22, the fin(s) 48 impel the air radially outwardly toward the exhaust nozzle section 28 due to a pressure differential.

Anti-vortex features 62 can be employed with the cover plate 40. The anti-vortex features 62 can include radial holes and/or vanes oriented radially distal from the internal fin(s) 48 relative to the axis A. The anti-vortex features 62 can be employed with the cover plate 40 at a location proximate the upstream face 54 of the rotor disk 30 downstream from the fin(s) 48. The anti-vortex features 62 can be configured as tubing/passages that are configured to prevent swirling by the cooling air 34. Preventing swirling enables the pumping action of the cooling air 34 between the rotor disk 30 and cover plate 40.

An inverted bearing 64 located in a bearing compartment 65 proximate the cover plate 40 and rotor disk 30 is incorporated into the design disclosed. The inverted bearing 64 has a static inner race 66 and rotating outer race 67. The inverted bearing 64 includes a dynamic outer diameter sump 68 that is configured to spin. The inverted bearing is configured opposite a typical rotor bearing. The inverted bearing 64 allows for lubrication from a liquid lubricant 70 sourced from a tank 72. In an exemplary embodiment, the tank 72 can be a fuel tank 72. The liquid lubricant 70 can be liquid fuel lubricant 70. The liquid lubricant 70 can be entrained in the cooling air 34 and provided to the inverted bearing 64 to lubricate contacting rotating elements 74. The excess liquid lubricant 70 can be carried with the cooling air 34 and pumped away from the inverted bearing 64 after providing lubrication, impelled by the pumping action induced by the rotation of the rotor disk 30 and cover plate 40. By utilizing the liquid lubricant 70 there is no need for more complex lubricant oil components making the gas turbine engine 10 simpler and less costly. The liquid lubricant 70 provides sufficient lubrication for the limited duration anticipated by the attritable gas turbine engine 10.

A technical advantage of the disclosed bearing scavenge pump incorporated into the high-pressure turbine disk cover plate includes a design that permits the air that cools the bearing to be fed from a lower pressure source.

Another technical advantage of the disclosed bearing scavenge pump incorporated into the high-pressure turbine disk cover plate includes a design that permits the air that cools the bearing to be fed from a cooler source.

Another technical advantage of the disclosed bearing scavenge pump incorporated into the high-pressure turbine disk cover plate includes a design that provides operating conditions that are beneficial to bearing health and life.

Another technical advantage of the disclosed bearing scavenge pump incorporated into the high-pressure turbine disk cover plate includes radial holes and/or vanes under the cover plate act as a centrifugal pump, pressurizing the flow of cooling air exiting the bearing compartment as it flows outward in the radius between the disk and cover plate to the exhaust nozzle section.

Another technical advantage of the disclosed bearing scavenge pump incorporated into the high-pressure turbine disk cover plate includes the elimination of a buffer cooler on the cooling air system.

Another technical advantage of the disclosed bearing scavenge pump incorporated into the high-pressure turbine disk cover plate includes a design that simplifies routing of the secondary air flow.

There has been provided a bearing scavenge pump incorporated into high-pressure turbine disk cover plate. While the bearing scavenge pump incorporated into high pressure turbine disk coverplate has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A bearing scavenge pump incorporated into a disk cover plate comprising:
   a rotor disk having a rear surface and an axis;
   the disk cover plate attached to the rotor disk, the disk cover plate including anti-vortex features extending into a gap formed between the rear surface of the rotor disk and the disk cover plate;
   an inverted bearing located in a bearing compartment proximate and upstream of the disk cover plate and the rotor disk, wherein the inverted bearing includes a static inner race and dynamic outer race configured to spin and a sump configured to spin; and
   a liquid fuel lubricant contacting the inverted bearing, wherein the liquid fuel lubricant is introduced into a cooling air upstream of the inverted bearing, entrained in the cooling air and provided to lubricate the inverted bearing and where at least a portion of the cooling air is scavenged with the liquid fuel lubricant; wherein an excess liquid fuel lubricant is carried with the cooling air and pumped away from the inverted bearing after providing lubrication, impelled by a pumping action induced by rotation of the rotor disk and cover plate downstream of the inverted bearing.

2. The bearing scavenge pump incorporated into the disk cover plate according to claim 1, wherein the disk cover plate includes fins located at least one of on a lower portion of the disk cover plate, inside a chamber formed between the rotor disk and the disk cover plate upstream of the lower portion, or both.

3. The bearing scavenge pump incorporated into the disk cover plate according to claim 2, wherein the fins are configured to cause the cooling air to be pumped radially outward relative to the axis toward an exhaust nozzle section.

4. The bearing scavenge pump incorporated into the disk cover plate according to claim 1, wherein the anti-vortex features are configured as tubing/passages that are configured to prevent swirling by the cooling air.

5. An attritable gas turbine engine turbine section with a bearing scavenge pump incorporated into a disk cover plate comprising:
   turbine rotors including a rotor disk, and a plurality of circumferentially spaced turbine blades, the rotor disk having a rear surface and an axis;
   the disk cover plate attached to the rotor disk, the disk cover plate including anti-vortex features extending into a gap formed between the rear surface of the rotor disk and the disk cover plate;
   an inverted bearing located in a bearing compartment proximate and upstream of the disk cover plate and the rotor disk, wherein the inverted bearing includes a static inner race and dynamic outer race configured to spin and sump configured to spin; and
   a fuel tank configured to provide a liquid fuel lubricant to the inverted bearing, wherein the liquid fuel lubricant is introduced into a cooling air upstream of the inverted bearing, where at least a portion of the cooling air is scavenged with the liquid fuel lubricant; wherein an excess liquid fuel lubricant is carried with the cooling air and pumped away from the inverted bearing after providing lubrication, impelled by a pumping action induced by rotation of the rotor disk and cover plate downstream of the inverted bearing.

6. The attritable gas turbine engine turbine section with the bearing scavenge pump incorporated into the disk cover plate according to claim 5, wherein the disk cover plate includes fins located at least one of on a lower portion of the cover plate, inside a chamber formed between the rotor disk and the disk cover plate upstream of the lower portion, or both.

7. The attritable gas turbine engine turbine section with the bearing scavenge pump incorporated into the disk cover plate according to claim 6, wherein the fins are configured to cause air to be pumped radially outwardly relative to the axis toward an exhaust nozzle section.

8. The attritable gas turbine engine turbine section with the bearing scavenge pump incorporated into the disk cover plate according to claim 5, wherein the anti-vortex features are configured as tubing/passages that are configured to prevent swirling by cooling air.

9. A process for lubricating an attritable gas turbine engine turbine section with a bearing scavenge pump incorporated into a disk cover plate comprising:
   providing turbine rotors including a rotor disk, and a plurality of circumferentially spaced turbine blades, the rotor disk having a rear surface and an axis;
   attaching the disk cover plate to the rotor disk, the disk cover plate including anti-vortex features extending into a gap formed between the rear surface of the rotor disk and the disk cover plate;
   locating an inverted bearing in a bearing compartment proximate and upstream of the disk cover plate and the rotor disk, wherein the inverted bearing includes a static inner race and dynamic outer race configured to spin and sump configured to spin; and
   contacting the inverted bearing with a liquid fuel lubricant;
   introducing the liquid fuel lubricant into a cooling air upstream of the inverted bearing, entrained in the cooling air and provided to lubricate the inverted bearing;
   scavenging at least a portion of the cooling air with the liquid fuel lubricant;
   carrying the liquid fuel lubricant with the cooling air; and
   pumping the liquid fuel lubricant away from the inverted bearing after providing lubrication, impelled by a pumping action induced by rotation of the rotor disk and cover plate downstream of the inverted bearing.

10. The process of claim 9, further comprising:
supplying the cooling air to the rear surface of the rotor disk between an axially downstream side of the disk cover plate and an axially upstream face of the rotor disk.

11. The process of claim 9, further comprising:
forming the gap between the disk cover plate and a contour of the rotor disk; and
creating a boundary layer effect that pumps the cooling air from a central location to a radially outward location near an exhaust nozzle section responsive to rotation of the disk cover plate and the rotor disk.

12. The process of claim 9, further comprising:
configuring the anti-vortex features as tubing/passages; and preventing swirling by cooling air.

13. The process of claim 9, wherein the disk cover plate includes fins located at least one of on a lower portion of the disk cover plate, inside a chamber formed between the rotor disk and disk cover plate upstream of the lower portion, or both.

\* \* \* \* \*